United States Patent [19]

Baldwin et al.

[11] 3,968,185

[45] July 6, 1976

[54] PREPARATION OF MODIFIED ELASTOMERS

[76] Inventors: Francis P. Baldwin, 19 Winchester Road, Summit, N.J. 07901; Alberto Malatesta, 202 Avenue Churchill, 1180 Brussels, Belgium

[22] Filed: Dec. 9, 1974

[21] Appl. No.: 530,613

[52] U.S. Cl. .................. 260/880 R; 260/878 R; 260/879; 526/12; 526/20; 526/213; 526/217; 526/230; 526/330
[51] Int. Cl.² .................................. C08F 255/10
[58] Field of Search ........ 260/853 C, 878 R, 880 R, 260/879; 450/610.5

[56] References Cited

UNITED STATES PATENTS

| 3,661,877 | 5/1972 | Bluestein et al. .................. 260/86.7 |
| 3,775,387 | 11/1973 | Baldwin ..................... 260/85.3 C X |
| 3,816,371 | 6/1974 | Baldwin et al. ............ 260/85.3 C X |
| 3,852,253 | 12/1974 | Malatesta ................... 260/85.3 C X |

*Primary Examiner*—William F. Hamrock

[57] ABSTRACT

Disclosed is a method for crosslinking elastomers containing randomly distributed sites of conjugated olefinic unsaturation of which the crosslinks are comprised of chains of free radical polymerizable monomers.

18 Claims, No Drawings

PREPARATION OF MODIFIED ELASTOMERS

BACKGROUND OF THE INVENTION

Curing of unsaturated polymers and grafting onto unsaturated elastomers is well known in the art. Such prior art produces either a nonrubbery product or a product not obtainable by the easily processable mixes of the present invention.

For example, U.S. Pat. No. 3,791,655 discloses a method for preparing a hard rubber compound by grafting a carboxamide onto polybutadiene in the presence of a free radical initiator. Monomers such as strurene and vinyl toluene were used to crosslink PVC in U.S. Pat. No. 3,725,714, but here, as in the above aforementioned patent, the product is nonrubbery and the polymer is not a polymer containing randomly distributed sites of conjugated olefinic unsaturation as in the present invention.

SUMMARY OF THE INVENTION

This invention relates to the graft curing of polymers containing randomly distributed sites of conjugated olefinic unsaturation by reacting such polymers with a free radical polymerizable monomer and a free radical initiator. It has now surprisingly been found that polymeric chains of monomers can be grafted onto polymers containing conjugated olefinic unsaturation while simultaneously crosslinking the entire system into an integral mass. The crosslinks are comprised of polymeric chains of the chosen monomer. This overall process will hereinafter be referred to as graft curing. In particular, this invention is directed to elastomers containing randomly distributed sites of conjugated olefinic unsaturation; especially such elastomers as conjugated diene butyl rubber and terpolymers of ethylene, a $C_3$ to $C_{10}$ alpha olefin and a polyene which on incorporation into the polymer deposits therein sites of conjugated olefinic unsaturation.

Heretofore, certain forming and molding techniques were not compatible with high molecular weight conjugated olefinic unsaturated polymers in view of the fact that such polymers exhibited a high viscosity. This invention enables one to use high molecular weight polymers containing conjugated olefinic unsaturation in such molding techniques as sheet molding, lay-up fabrication and even relatively low clamp pressure injection molding. Such techniques are now available to such high molecular weight polymers in view of the fact that the crosslinking free radical polymerizable monomer serves as a diluent in lowering the viscosity of the polymer.

DETAILED DESCRIPTION

The expression "butyl rubber" is used in the rubber industry to describe copolymers made from a polymerization reaction mixture having therein from 70 to 99.5% by wt. of an isoolefin which has about 4 to 7 carbon atoms, e.g., isobutylene, and about 30 to 0.5% by wt. of a conjugated multiolefin having from about 4 to 14 carbon atoms, e.g., isoprene. The resulting copolymers contain 85 to 99.5% by wt. of combined isoolefin and about 0.5 to 15% of combined multiolefin. The preparation of butyl rubber is described in U.S. Pat. No. 2,356,128, which is incorporated herein by reference.

The polymer backbone of commercial butyl rubber is made up primarily of isobutylene units, with just a few percent of isoprene units. The isoprene units contribute the small amount of unsaturation present in butyl rubber. The basic equation is represented by:

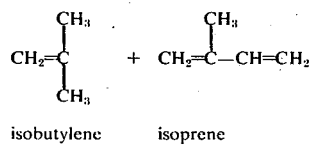

isobutylene    isoprene which combine in the presence of Friedel-Crafts catalysts to form:

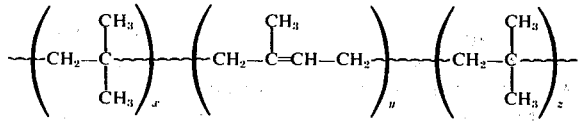

where $x+z$ represent the number of isoolefin units incorporated in the butyl rubber, while $y$ represents the number of olefin units derived from incorporation of the diene present, substantially as randomly distributed units. The conjugated diolefin, isoprene, loses one olefinic linkage upon its essentially random incorporation into the polymer backbone.

Thus, butyl rubber, as presently produced, contains only a small percentage of unsaturation, in the form of the single double bond associated with the isoprene residue which is incorporated more or less randomly throughout the polymer chain.

Butyl rubber can be produced containing conjugated unsaturation. The general formula may be represented by:

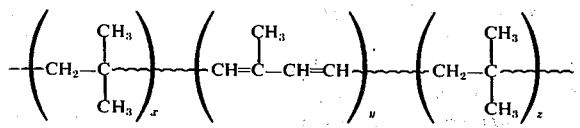

where $x$, $y$ and $z$ have the values previously described, though at least one double bond may lay outside the linear backbone. This variation may be represented by the formula:

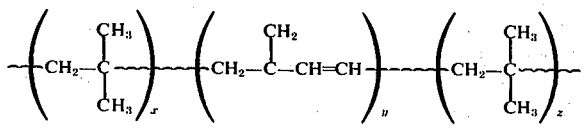

This new butyl rubber has been termed "conjugated diene butyl", hereafter referred to as CDB, regardless of the structure of the conjugated unsaturation.

CDB is more completely described in U.S. Pat. No. 3,816,371 and copending U.S. application Ser. No. 465,479. One of the preferred methods of preparing this butyl rubber is described in U.S. Pat. No. 3,775,387, all of which are incorporated herein by reference.

The CDB, containing the conjugated-olefinic unsaturation, may be prepared by dehydrohalogenation of halogenated butyl rubber.

Halogenated butyl rubber has been developed in recent years and has contributed significantly to the elastomer business. A method of preparing halogenated butyl rubber is described in U.S. Pat. No. 3,099,644, which is incorporated herein by reference.

Both chlorinated and brominated butyl rubber are well known in the art. The formula for halogenated butyl rubber is representable by:

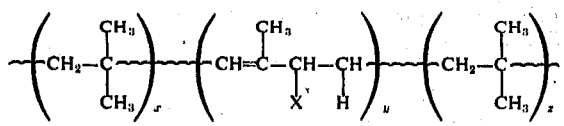

where $x$, $y$ and $z$ have the same values as for butyl rubber, described above, though this structure is but one of several which can be formed, depending on the conditions of halogenation, the halogenating agent used, etc.

The important feature depicted is that the halogen atom is on a carbon atom which is alpha to a double bonded carbon and hydrogen on the carbon atom next to that to which halogen is attached (i.e., on the carbon atom beta to the double bonded carbon).

Halogenated butyl rubber is commercially available and may be prepared by halogenating butyl rubber in a solution containing 1 to 60% by weight butyl rubber in a substantially inert $C_5$–$C_8$ hydrocarbon solvent such as pentane, hexane, heptane, etc., and contacting this butyl rubber cement with a halogen gas for a period of about 2–25 minutes. There is then formed the halogenated butyl rubber and a hydrogen halide, the polymer containing up to one or somewhat more, especially in the case of bromine, halogen atoms per double bond initially present in the polymer. This invention is not intended to be limited in any way by the manner in which butyl rubber is halogenated or dehydrohalogenated and both chlorinated and brominated butyl rubber are suitable for use in preparing CDB.

Illustrative of halogenated butyl rubber is Exxon Butyl HT 10–68 (a chlorinated butyl rubber which before halogenation analyzes ~1.8 mole % unsaturation and a viscosity average molecular weight of about 450,000). However, for the purposes of this invention, it is preferred that the butyl rubber starting material have incorporated therein from about 0.5 to 6 mole % of combined diolefin, more preferably 0.5 to 3 mole %, e.g., about 2 mole %.

Conventional high molecular weight butyl rubber generally has a number average molecular weight of about 25,000 to about 500,000, preferably about 80,000 to about 300,000, especially about 100,000 to about 250,000, and a Wijs Iodine No. of about 0.5 to 50, preferably 1 to 15. More recent low molecular weight polymers are prepared to have number average molecular weights of from 5,000 to 25,000 and unsaturation expressed as mole %, of 2–10.

A particularly advantageous method of preparing conjugated diene-containing butyl polymers comprises heating a solution of halogenated butyl rubber in the presence of a soluble metal carboxylate. Suitable metals are the polyvalent metals of Groups Ib, IIb, IVa and VIII, of the Periodic Table, having a relatively high first ionization potential and whose halides are to some extent soluble in the hydrocarbon reaction medium at the reaction temperature. Typical of these are zinc, iron, mercury, nickel, copper, tin and cadmium carboxylates.

Especially useful are the soluble carboxylic acid salts of zinc (e.g., zinc salts of naphthenic or aliphatic carboxylic acids). While useful in preparing the compositions of the present invention, potential toxicity problems which could be encountered in practicing the present invention might limit the use of certain metals, such as cadmium and mercury salts, for example.

In dehydrohalogenating the halogenated butyl rubber, zinc chloride is thought to be a by-product in the reaction. Zinc chloride, being an effective Friedel-Crafts type catalyst, may lead to molecular weight degradation or crosslinking of the halogenated polymers, depending on the structure of the polymer, the solvent being employed, the reaction temperature, etc.

This difficulty is overcome, in the instant invention, by having present in the reaction zone a metal oxide, hydroxide or carboxylate whose halogen salt is insoluble in the reaction medium.

It has been found that the mole percent of conjugated olefinic unsaturation in a typical dehydrohalogenated butyl prepared from chlorinated or brominated commercial butyl rubber, ranges from about 0.5 to about 3.0 mole %.

While the CDB may be crosslinked by a variety of reagents such as sulfur, sulfur-containing curing agents, UV radiation, polyfunctional dienophiles, and the like, there are several applications for the high reactivity rubber in which such cures are not suitable. Moreover, simple crosslinking of the elastomer cannot supply the alterations in vulcanizate properties provided by the graft curing technique.

Thus, if high molecular butyl is to be used for low pressure injection molding, conventional fabrication techniques are not suitable in view of its excessive viscosity.

It will be readily evident to those skilled in the art that the practice of this invention is not limited to butyl rubber; but, applies to any elastomer containing randomly distributed sites of conjugated olefinic unsaturation.

Illustrative of such an elastomer containing conjugated olefinic unsaturation other than CDB, would be the elastomeric copolymer of ethylene, a $C_3$ to $C_{10}$ alpha olefin, and a 5,6-di-methylene-2-norbornene as taught in U.S. Pat. No. 3,681,309 which is incorporated herein by reference.

This elastomeric copolymer of ethylene may be prepared by first forming a monomer mixture containing ethylene as a first component, a $C_3$ to $C_{10}$ alpha olefin as a second component, and a 5,6-dimethylene-2-norbornene as a third component, and then polymerizing this mixture in the presence of a compound of a transition metal as catalyst and an organometal compound as cocatalyst, thereby forming a copolymer of ethylene, a $C_3$ to $C_{10}$ alpha olefin, and a 5,6-dimethylene-2-norbornene, wherein the copolymer contains conjugated residual unsaturation derived from the 5,6-dimethylene moiety of said norbornene; and withdrawing said copolymer as product.

The ethylene used in preparation of this terpolymer may typically be purified commercially available ethylene of greater than 99.98% purity, typically 99.98%–99.999%, say 99.99%. It may contain less than 0.02%, typically 0.001%–0.02%, say 0.01% non-olefinic impurities, and less than 0.001%, say 0.0001%–0.0005% water.

The alpha olefin, also called a terminal olefin, may be a purified commercially available $C_3$ to $C_{10}$ olefin having a purity of greater than 99.98%, typically 99.98–99.999%, say 99.99%. It may contain less than 0.02%, say 0.001%–0.02%, say 0.01% non-olefinic impurities and less than 0.001%, say 0.0001%–0.0005% water.

Non-polar impurities, such as ethane or other hydrocarbons may be present, but for best results, polar compounds such as oxygen, water, carbon dioxide, carbon monoxide may be maintained at the indicated low levels in the ethylene and alpha olefin feeds.

The alpha olefin having three to ten carbon atoms, may be designated by the formula $R'-CH=CH_2$ wherein $R'$ is hydrocarbon and typically selected from the group consisting of alkyl, alkaryl, aralkyl, and aryl. Most preferably $R'$ may be a fully saturated alkyl including cycloalkyl. Alpha olefins may include typically:

TABLE I

| | |
|---|---|
| propene | 3-ethyl pentene-1 |
| butene-1 | octene-1 |
| pentene-1 | 3-methyl heptene-1 |
| 3-methyl butene-1 | 4-methyl heptene-1 |
| hexene-1 | 5-methyl heptene-1 |
| 3-methyl pentene-1 | 6-methyl heptene-1 |
| 4-methyl pentene-1 | 3-ethyl hexene-1 |
| heptene-1 | 4-ethyl hexene-1 |
| 3-methyl hexene-1 | 3-propyl hexene-1 |
| 4-methyl hexene-1 | decene-1 |
| 5-methyl hexene-1 | |

The preferred alpha olefin may be propylene, i.e. propene.

The polyene may include those inertly substituted compounds having the Formula I wherein the carbon atoms are designated by number for easy reference.

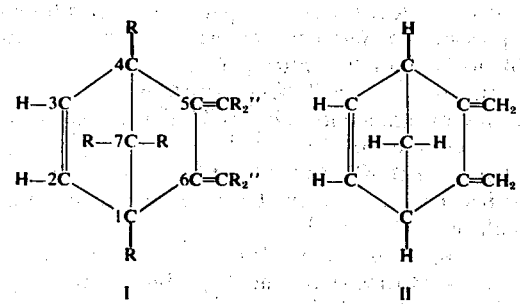

I            II

In the Formula I, each of the R and R" groups may be hydrogen or hydrocarbon and preferably independently selected from the group consisting of hydrogen, alkyl, alkaryl, aralkyl, and aryl. When R or R" is alkyl, it may be methyl, ethyl, propyl, isopropyl, buty, hexyl, octyl, decyl, etc. When R or R" is alkaryl, it may be tolyl, xylyl, etc. When R or R" is aralkyl, it may be benzyl, etc. When R or R" is aryl, it may be phenyl, naphthyl, etc. The preferred R and R" groups may be alkyl and aryl having up to 12 carbon atoms.

In the preferred embodiment, the R groups may be hydrogen. In the most preferred embodiment, R and R" are hydrogen, and the composition is 5,6-dimethylene-2-norbornene se (II).

Typical 5,6 - dimethylene - 2 - norbornene compounds which may be employed may include:

TABLE II 5,6-dimethylene-2-norbornene
1-methyl-5,6-dimethylene-2-norbornene
1-ethyl-5,6-dimethylene-2-norbornene
1-butyl-5,6-dimethylene-2-norbornene
7-methyl-5,6-dimethylene-2-norbornene
7-butyl-5,6-dimethylene-2-norbornene
1-cyclohexyl-5,6-dimethylene-2-norbornene
7-methyl-5,6-dimethylene-2-norbornene
7-propyl-5,6-dimethylene-2-norbornene
7-ethyl-5,6-dimethylene-2-norbornene
1-phenyl-5,6-dimethylene-2-norbornene These materials may be readily available or they may be prepared by procedures well known to those skilled in the art.

Formation of these copolymers may be effected by forming a mixture of the three components containing the following molar parts:

TABLE III

| Component | Broad Range | Preferred Range | Preferred |
|---|---|---|---|
| Ethylene | 1,000–2,500 | 1,250–1,900 | 1,700 |
| Alpha olefin | 1,600–7,500 | 2,000–3,300 | 2,500 |
| 5,6-dimethylene 2-norbornene | 15–200 | 25–40 | 30 |

Mixtures of these compounds may be used, i.e. more than one alpha olefin and/or more than one 5,6-dimethylene- 2-norbornene may be employed. Other compatible components, including those which are copolymerizable to form tetrapolymers may be present including e.g. aromatic mono-olefins such as styrene, etc.

The following may be representative of copolymers which may be prepared by the process of this invention:
  ethylene/propylene/5,6-dimethylene-2-norbornene;
  ethylene/propylene/1-methyl-5,6-dimethylene-2-norbornene;
  ethylene/propylene/1-ethyl-5,6-dimethylene-2-norbornene;
  ethylene/1-butene/5,6-dimethylene-2-norbornene;
  ethylene/1-hexene/5,6-dimethylene-2-norbornene;
  ethylene/4-methyl-1-hexene/7-methyl-5,6-dimethylene-2-norbornene;
  ethylene/1-decene/1-cyclohexyl-5,6-dimethylene-2-norbornene.

Graft curing of the CDB is accomplished by reacting the CDB in the presence of a free radical initiator with free radical polymerizable monomers for a time long enough to decompose most of free radical initiator or convert most of the monomer to polymer. The monomer polymerizes and these polymeric chains of monomer become the crosslinks connecting the elastomeric chains. Although not wishing to be limited by theory, it is believed that the generated polymeric chains may connect in any of the following ways:

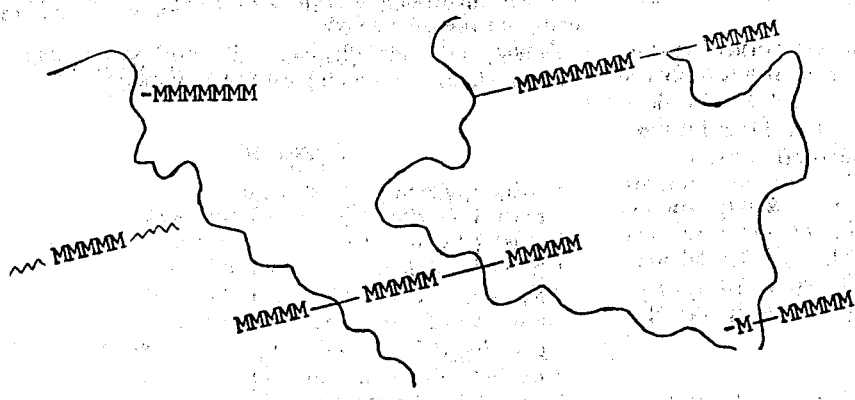
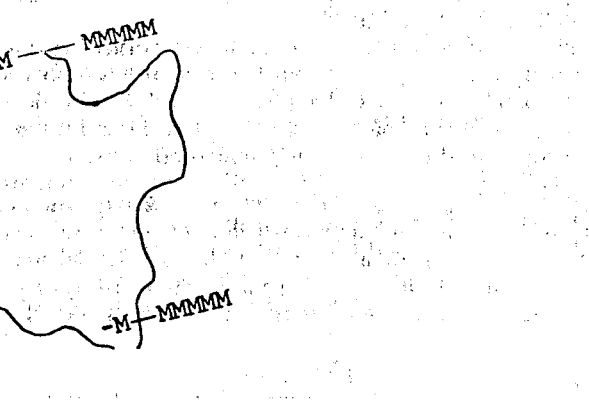

that is, the elastomer chains are crosslinked and the crosslinks are polymeric chains of the monomer, M. Some M chains will connect 2 or more elastomer chains or 2 or more points in a given elastomer chain. Some M chains will not be connected to the network at all. Some will be connected to the elastomer molecule at just one point and, therefore, be a simple graft.

Obviously, but not illustrated in the diagram, some elastomer chains may be connected directly one to the other. The number of such connections will depend on the amount of monomer employed, its relative reactivity, etc.

It is preferred that the elastomers suitable for use in this invention have from about 0.15 to about 10 mole % conjugated olefinic unsaturation. The amount of free radical polymerizable monomer suitable for use in this invention is preferably in aggregate at least 1 mole of polymerizable groups per mole of conjugated olefinic unsaturation in the elastomer.

A variation of the process would employ prereaction of the polymer with a polyfunctional active dienophile such as a di or higher acrylate or methacrylate ester via Diels-Alder coupling. This would produce a polymer with active polymerizable groups pendant to the chain as depicted below:

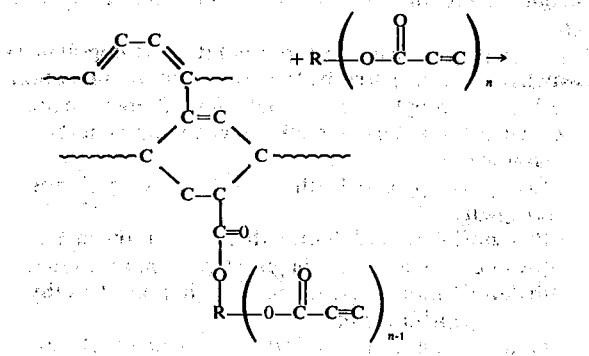

where R is a polyvalent hydrocarbon radical and n is the number of functional groups.

This modified polymer may then be cured directly with free radical initiators or diluted further with radical polymerizable monomers and graft cured.

Also, it is within the scope of this invention to employ such polyfunctional monomers in minor quantities to adjust the viscosity of the mixture by pre-crosslinking the polymer containing conjugated olefinic unsaturation to a point below the gelation point of the mixture prior to conducting the graft curing operations.

Also, within the concept of this invention, nonpolymerizable functional groups may be implanted on the polymer molecule by pre-reaction of part of the conjugated olefinic unsaturation with dienophiles, such as maleic anhydride; acrolein; acrylic and methacrylic acids and acid chlorides; acrylic, methacrylic and maleic acid esters or amides containing at least one other functional group (e.g. OH, $NH_2$, halogen, olefin, etc.).

Useful monomers for this invention may be selected from the list of free radical polymerizable monomers shown in "Appendix A and Appendix B" of the book Copolymerization by George E. Ham, Interscience Publishers (1964) on pages 695 to 863, subject to the conditions that the monomer be nongaseous, soluble and as stated above, polymerizable.

By nongaseous, we mean that the monomer or monomers employed must be liquids or solids at the mixing temperatures and hydrostatic pressures employed during mixing, normally at room temperature and atmospheric pressure.

By soluble, we mean that the monomer or monomers mixture must be soluble in the amounts used in the polymer or polymer-inert diluent mixture at the temperature at which graft curing is to be conducted, usually $-20°$ to $150°C$.

By polymerizable, we mean that the monomer or monomers employed must be capable of forming homo or copolymers of number average molecular weight $\geq 500$ at the graft curing temperature.

Illustrative of such monomers which are suitable for use in this invention and which we in no way wish to be limited thereto include:

A. the vinyl substituted aromatics such as styrene, divinyl benzene, trivinyl benzene, and vinyl naphthalene;
B. the ring substituted vinyl aromatics such as 1-vinyl-4-chlorobenzene and 1-vinyl-4-tertiary butyl benzene;
C. the acrylic and methacrylic acid esters of alcohols and glycols or substituted alcohols or glycols, such as methyl methacrylate, octadecyl acrylate, methyl acrylate and isobutyl methacrylate; and
D. the vinyl esters of simple or polycarboxylic acids, such as vinyl acetate, vinyl benzoate, vinyl propionate, and vinyl undecanoate, divinyl azelate.

Polyfunctional monomers can also be incorporated with or in place of the free radical polymerizable monomer. When polyfunctional monomers are used with the free radical polymerizable monomer, crosslinks are produced within the monomer chains so that not only is the elastomer crosslinked via monomer chains, but the monomer chains themselves may be crosslinked as below:

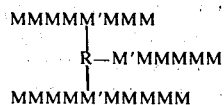

where M is a free radical polymerizable monomer and $R(M')_n$ is a polyfunctional free radical polymerizable monomer wherein n is the number of polymerizable groups.

Polyfunctional monomers, as used in this invention, are defined as those monomers containing two or more polymerizable groupings chosen from those groupings which define a simple monomer (only one polymerizable grouping). For example, styrene would be a simple monomer and di- and tri- vinyl benzene would be corresponding polyfunctional monomers. Another example would be propyl methacrylate representing the simple monomer and 1,3 propane diol dimethacrylate, 1,2-propanol diol dimethacrylate and trimethyl propane trimethacrylate representing corresponding polyfunctional monomers. These polyfunctional monomers, to be useful in this invention, would also be required to be liquid or solid at room temperature and atmospheric pressure as indicated previously.

The process disclosed in this invention enables one to vary not only the physical properties but also the chemical properties of the product over a wide range, depending on both the amounts and the nature of the particular monomers used.

The free radical initiators which are suitable for use in the present invention include irradiation; organic peroxides; organic hydroperoxides and azo compounds.

Illustrative of some peroxides useful in this invention include the dialkyl and diacyl peroxides.

The dialkyl peroxides have the general structure R OO R', where R and R' can be the same or different primary, secondary or tertiary alkyl, cycloalkyl, aralkyl, or heterocyclic radicals. Included in this group of peroxides which are suitable for use in this invention are dicumyl peroxide, di-t-butyl peroxide, t-Butylcumyl peroxide and 2,5-Dimethyl-2, 5-bis (t-butyl peroxy) hexane.

Diacyl peroxides have the general structure RC(O)OOC(O)R' where R and R' are the same or different alkyl, cycloalkyl, aralkyl, aryl or heterocyclic radicals. Illustrative of some diacyl peroxides suitable for use in this invention are dilauroyl peroxide, dibenzoyl peroxide, dicetyl peroxide, didecanoyl peroxide, di (2,4-dichlorobenzoyl) peroxide, diisononanoyl peroxide and 2-methylpentanoyl peroxide.

As will be evident to those skilled in the art any organic peroxide which is useful in cross-linking polymers or initiating polymerization is encompassed in the present invention.

The basis for choice of peroxide for use in this invention include such things as the half life of the peroxide at the mixing and/or curing temperature and the compatability of the selected peroxide in the system.

Examples of hydroperoxides which are suitable for use in the present invention include t-butyl hydroperoxide, cumyl hydroperoxide, 2,5-dimethyl-2,5 dihydroperoxyhexane, p-methane hydroperoxide and diisopropylbenzenehydroperoxide.

Examples of some azo compounds which are suitable for use as free radical initiators in this invention include diazoaminobenzene, N,N'-dichloroazodicarbonamide, azo dicarboxylic acid diethyl ester and azo bis (isobutyronitrile).

Irradiation suitable for use in this invention include alpha radiation, gamma radiation, uv radiation and electron beam radiation or any other high-energy radiation regardless of the source of energy (photons, protons, electrons, neutrons, etc.).

Tertiary amines can also be used in this invention to promote decomposition of the organic peroxide. To be suitable in this invention, the tertiary amine must be soluble in the mixture employed at curing temperature. Illustrative of such suitable tertiary amines are triethylamine, tributylamine, 2,4,6-tris (dimethylamino) phenol, and 3,3,7,7-tetramethylbicyclo (3,3,0) octane.

Metal carboxylates may also be used in this invention to accelerate decomposition of the peroxides to radical fragments. Illustrative of metal carboxylates suitable for use in this invention are the naphthenates, octoates and tallates of metals selected from the group consisting of aluminum, cobalt, vanadium, copper, calcium, lead, mercury, zinc, manganese, magnesium, zirconium and iron.

It will be evident to those skilled in the art that a mixture of peroxide with varying half life at a given temperature can be used to control the polymerization reaction. Also apparent to those skilled in the art is the mixing of conventional fillers, oils, etc. with the elastomer monomer mixtures of this invention.

This invention and its advantages will be better understood by reference to the following examples.

EXAMPLES 1-3

A butyl polymer was collected by precipitation from plant feed cement prepared in the commercial chlorobutyl solvent replacement process (SRP). This butyl polymer contained about 1.8 mole percent unsaturation and displayed a Mooney viscosity of 66.5 at 100°C.

Three 31.5 g samples of vacuum oven dried precipitated SRP butyl were cut into small pieces and the pieces of each sample were put into a separate 8 oz. ointment jar. To each jar, 13.5 g of styrene was added. The air in each jar was displaced by nitrogen; the jars were sealed and allowed to stand overnight. After said standing, the styrene became imbibed by the butyl. These monomer swollen polymers were then mixed in a Brabender Plastograph as follows:

TABLE I

| SAMPLE | No. 1 | No. 2 | No. 3 |
|---|---|---|---|
| Butyl + styrene | 45.0 g. | 45.0 g. | 45.0 g. |
| Calcium stearate | 0.45 g. | 0.45 g. | 0.45 g. |
| Lauroyl Peroxide | 0.10 g. | 0.20 g. | 0.45 g. |

Portions of these mixes (stored under nitrogen) were then heated (cured) under pressure between mylar film in a mold in a small electrically heated press at 100°C. for 40 minutes or about 7 times the peroxide half-life. On removal from the mold, the specimens were white, opaque and sticky to the touch despite the presence of calcium stearate, an anti-tack agent.

Immersion of pieces taken from the specimens in solvents revealed that all disintegrated to yield a cloudy solution in cyclohexane and all dissolved in toluene (a solvent both for polystyrene and butyl) to yield a clear solution. Thus, there was no evidence of crosslinking and the polystyrene formed was probably dispersed in particle sizes of the order of the wavelength of visible light to cause the opacity of the samples.

EXAMPLES 4–6

In contrast to Examples 1–3, the polymer used here was CDB as opposed to butyl. The CDB was prepared as previously described in this specification and contained about 1.30 mole percent conjugated diene.

Again separate 31.5 g. samples of the polymer (here CDB) were cut into small pieces and the pieces from each sample were placed in a separate 8 oz. ointment jar. To each jar 13.5 g. of styrene was added. The air in each of the 3 jars was displaced by nitrogen; the jars were sealed and allowed to stand overnight. After standing overnight, the styrene became imbibed by the CDB. These monomer swollen polymers were then mixed in a Brabender Plastograph as follows:

TABLE II

| SAMPLE | No. 4 | No. 5 | No. 6 |
| --- | --- | --- | --- |
| CDB + styrene | 45.0 g. | 45.0 g. | 45.0 g. |
| Calcium stearate | 0.45 g. | 0.45 g. | 0.45 g. |
| Lauroyl peroxide | 0.10 g. | 0.20 g. | 0.45 g. |

Portions of these mixes (stored under nitrogen) were then heated (cured) under pressure between mylar film in a mold in a small electrically heated press at 100°C. for 40 minutes or about 7 times the peroxide half-life.

On removal from the mold these samples were transparent but displayed slight opalescence caused by the insoluble calcium stearate and "dry" to the touch. Fluid immersion tests of these samples were also conducted and the results are shown below in Table III.

TABLE III

| SAMPLE | No. 4 | No. 5 | No. 6 |
| --- | --- | --- | --- |
| Tensile, psi | 540 | 375 | 420 |
| Elongation, % | 405 | 355 | 345 |
| Stress at 300% E | 290 | 270 | 325 |
| Swelling Ratio[1] -% Insolubles[2] | | | |
| in Cyclohexane | 5.33–92.15 | 4.81–95.2 | 4.40–97.2 |
| in Methylethyl Ketone (MEK) | 1.34–92.15 | 1.36–94.4 | 1.36–95.8 |
| in Toluene | | | 4.30–96.3 |

[1]Swollen Wt./Dry Weight
[2](Dry wt./original wt.) × 100

The above data show that the polystyrene chains are intimately bound into the crosslinked network in view of the fact that the percent insolubles are high in all of the solvents. Cyclohexane is a solvent for CDB, but not for polystyrene. Methylethyl ketone is a solvent for polystyrene, but not for CDB. And toluene is a solvent for both CDB and polystyrene.

Preparations like those above in which calcium stearate was omitted were crystal clear. Thus, immobilization of the polystyrene chains by chemical attachment to the elastomer prevented formation of large polystyrene aggregates or domains. As indicated by Table III, the crosslink density of the elastomer increases as the peroxide level is increased as evidenced by the decline in swelling capacity in cyclohexane as the peroxide concentration is increased.

On the other hand, the swelling behavior of the polystyrene is little affected by the increase in peroxide as evidenced by the swelling capacity in methylethyl ketone. This suggests that it is the polystyrene chains which form the crosslinks between the elastomer molecules and that the chain junction points with the elastomer, per average polystyrene chain, are roughly comparable and may be relatively few in number.

Having illustrated the profound differences between the behavior of a polymer containing a low level of simple olefinic functionality (Examples 1–3) and one containing a low level of conjugated diene functionality (Examples 4–6), we can proceed with other examples which broadly illustrate the scope of this invention.

EXAMPLE 7

Using the technique and procedure described in Examples 1–6, the following ingredients were used:

| | |
| --- | --- |
| CDB | 31.5 g. |
| Styrene | 12.0 g. |
| Hexanediol dimethacrylate (a polyfunctional monomer) | 1.5 g. |
| Lauroyl peroxide | 0.2 g. |
| Calcium stearate | 0.45 g. |

After press curing at 100°C. for 40 minutes, a dry, transparent but opalescent sheet was formed with the following properties:

TABLE IV

| | |
| --- | --- |
| Tensile, psi | 945 |
| Elongation, % | 255 |
| Stress at 200% E | 615 |
| Swell Ratio in Toluene | 3.43 |
| % Insolubles | 95.9 |
| Swell Ratio in MEK | 1.28 |
| % Insolubles | 92.6 |

Comparing these data with those in Examples 4–6 in which the same peroxide concentration was employed, it is clear that the overall system in Example 7 is more highly crosslinked and that the polystyrene chains are themselves crosslinked as indicated by the lower swelling capacity in MEK. This Example clearly demonstrates the effect of employing a polyfunctional monomer along with a simple monomer in practice of this invention. Thus, while the polystyrene chains from crosslinks between elastomer molecules, these polystyrene chains can also be crosslinked as a result of copolymerization with the polyfunctional monomer.

EXAMPLES 8–9

Using the technique and procedure described in Examples 1–6, the following ingredients were used:

| | (8) | (9) |
| --- | --- | --- |
| CDB | 17 g. | 17 g. |
| 1,6 Hexanediol dimethacrylate | 3.0 g. | 3.0 g. |
| Primiol 355* | 4.0 g. | 4.0 g. |
| Silene EF** | 1.0 g. | 1.0 g. |
| Lauroyl peroxide | 0.1 g. | — |
| ABIN | — | 0.05 g. |

*A white oil
**A commercial calcium silicate

Sample (8) was press cured at 100°C. for 40 minutes and sample (9) at 110°C. for 40 minutes. The following properties were measured after curing:

| | (8) | (9) |
| --- | --- | --- |
| Swelling Ratio in Toluene | 3.03 | 3.24 |
| % Insoluble | 82.4 | 81.9 |

From the above data it is evident that one gets a crosslinking cure where only a polyfunctional polymerizable monomer is used as opposed to either the use of only monofunctional monomers or a mixture of monofunctional and polyfunctional monomers.

EXAMPLES 10-21

Using a smaller mixing device but the same method of preparing samples as described in Examples 1-7, a number of mixtures were prepared and tested. The data are indicated in Table V.

EXAMPLES 22-28

The following ingredients were added to each of 7 jars:

| | |
|---|---|
| CDB | 21.0 g. |
| n-hexylmethacrylate | 7.2 g. |
| 1,6-hexanedioldimethacrylate | 1.8 g. |

After the elastomer had soaked up the monomer, the mixtures were transferred to a Brabender Plastograph

TABLE V

MISCELLANEOUS GRAFT CURING EXPERIMENTS

| Ex. | CDB, g. | Monomer, g | Initiator, g[1] | Additives, g | Tensile, psi[2] | % Elongation[2] | Swelling Ratio | % Insolubles |
|---|---|---|---|---|---|---|---|---|
| (10) | 15.75 | Styrene, 5.06 Butyl Methacrylate, 1.68 | L.P., 0.075 | none | 575 | 365 | 4.50 | 91.3 |
| (11) | 15.75 | Styrene, 3.88 Butyl Methacrylate, 3.88 | L.P., 0.075 | none | 185 | 305 | 4.43 | 91.8 |
| (12) | 15.75 | Styrene, 5.07 Vinyl Propionate, 1.68 | L.P., 0.075 | none | 385 | 395 | 4.78 | 90.1 |
| (13) | 15.75 | Styrene, 3.88 Vinyl Propionate, 3.88 | L.P., 0.075 | none | 240 | 470 | 5.23 | 90.3 |
| (14) | 15.75 | Styrene, 5.07 Methyl Methacrylate, 1.68 | L.P., 0.075 | none | 855 | 400 | 4.50 | 93.0 |
| (15) | 15.75 | Styrene, 3.88 Methyl Methacrylate, 3.88 | L.P., 0.075 | none | 1385 | 365 | 4.19 | 95.2 |
| (16) | 15.75 | Styrene, 5.07 Ethyl Methacrylate, 1.68 | L.P., 0.075 | none | 555 | 375 | 4.56 | 92.2 |
| (17) | 15.75 | Styrene, 3.88 Ethyl Methacrylate, 3.88 | L.P., 0.075 | none | 995 | 395 | 4.49 | 93.7 |
| (18) | 15.75 | p-tert butyl styrene, 6.75 | L.P., 0.075 | none | 195 | 260 | 3.96 | 92.5 |
| (19) | 9.0 | Styrene, 9.0 Methyl Methacrylate, 4.5 | ABIN, 0.15 | none | 1235 | 620 | 9.48 | 81.7 |
| (20) | 9.0 | Styrene, 12.0 Trimethylolpropane-trimethacrylate, 1.5 | ABIN, 0.15 | none | 1605 | 200 | 2.71 | 99.3 |
| (21) | 9.0 | Styrene, 9.0 Trimethylolpropane-trimethacrylate, 0.2 | L.P., 0.10 | Primol 355, 4.5 Calcium Stearate, 0.2 | 925 | 435 | 5.65 | 77.1 |

L.P. = Lauroyl Peroxide
ABIN = 2,2'-azobisisobutyronitrile
Data obtained on 40'/100°C cured pads for L.P. initiated compound, 40'/110°C cured pads for ABIN initiated compound These data demonstrate: (1) the concept of using mixed monomers to vary properties of the cured elastomer; (2) the use of polyfunctional monomers to adjust properties; and (3) varying the concentration of monomer from about 42.9% to about 150% based on the amount of elastomer or from about 30% to 60% based on the amount of elastomer plus monomer.

Of particular interest are the last three examples (1g-21). Here high concentrations of monomer were employed and in the last example a hydrocarbon oil was employed to produce a very low viscosity compound. Even so, the compounds cured into integral networks. Obviously, the oil present in the compound at Example 21 would be extracted when the speciment was immersed in a solvent. This is evidenced by the (relatively) low percent insolubles for this example.

and additives incorporated as indicated below:

| | |
|---|---|
| 22 | 17.7 g Suprex Clay, 4.5 g zinc oxide, 0.3 g A-188,* 0.6 g stearic acid |
| 23 | 17.7 g McNamee Clay, 4.5 g zinc oxide, 0.3 g A-188*, 0.6 g stearic acid |
| 24 | 17.7 g Whitex Clay, 4.5 g zinc oxide, 0.3 g A-188*, 0.6 g stearic acid |
| 25 | 16.1 g Hydral 710, 4.5 g zinc oxide, 0.3 g A-188,* 0.6 g stearic acid |
| 26 | 14.3 g Celite 270, 4.5 g zinc oxide, 0.3 g A-188,* 0.6 g stearic acid |
| 27 | 18.3 g Mistron Vapor, 4.5 zinc oxide, 0.3 g A-188,* 0.6 g stearic acid |
| 28 | 13.4 g Hisil 215, 4.5 zinc oxide, 0.3 g A-188,* 0.6 g stearic acid |

*vinyltriacetoxysilane
To each of these were then added 0.2 g of lauroylperoxide.

The blended mixtures were then cured by molding each sample separately between Teflon coated aluminum foil for 35 minutes at 100°C. and the following results were obtained:

TABLE VI

| Compound | Swelling Ratio/% in Solubles Cyclohexane | MEK | Tensile, psi | Elongation, % |
|---|---|---|---|---|
| 22 | 1.97/99.4 | 1.16/99.0 | 1,000 | 105 |
| 23 | 2.03/99.1 | 1.17/99.2 | 905 | 110 |
| 24 | 2.04/99.0 | 1.16/98.9 | 990 | 110 |
| 25 | 2.27/98.7 | 1.19/98.7 | 820 | 125 |
| 26 | 2.15/98.5 | 1.17/98.7 | 735 | 100 |
| 27 | 2.04/99.3 | 1.16/99.0 | 1,025 | 125 |
| 28 | 1.69/98.3 | 1.16/98.2 | 1,360 | 80 |

From the above data, it is evident that the monomer chains constitute part of the crosslinked network in view of the low degree of swelling and high modulus of elasticity. Since all the fillers were added on an approximately equal volume basis, the reinforcing capacity of the fillers is indicated by the tensile strengths. Filler bonding to the polymer is good in view of the fact that vinyl-triacetoxysilane reacts with any OH groups on the filler leaving the vinyl group free to enter into the polymerization reaction. Other substituted silanes may also be used so long as at least one of the residues thereon can become involved in polymerization and the others can react with OH groups on the pigment, film, glass, fiber or other surface. Similarly, oher polymerization initiators, e.g., peroxides, may be used so that curing time and temperature adjustments can be made at will. Also reinforcement could be obtained by the inclusion of glass fibers either separately treated or treated in situ as were the pigments to insure intimate bonding between filler and matrix.

EXAMPLES 29 and 30

An EPDM containing randomly distributed sites of conjugated olefinic unsaturation was prepared by copolymerization of ethylene, propylene and a 5,6-dimethylene-2-norbornene. This polymer when analyzed showed an ethylene content of 50 wt. %, a propylene content of 48.6 wt. % and a dimethylenenorbornene content of 1.4 wt. %. The polymer was free of gel and was completely soluble in toluene.

Compositions were prepared as follows:

| EXAMPLE | 29 | 30 |
|---|---|---|
| EPDM | 3.75 g. | 3.75 g. |
| Styrene | 1.37 g. | 1.37 g. |
| Lauroyl Peroxide | 0.05 g. | 0.10 g. |

After curing for 35 minutes at 100°C in a press the composition exhibited the following properties:

TABLE VII

| EXAMPLE | 29 | 30 |
|---|---|---|
| Tensile, psi | 650 | 700 |
| Elongation, % | 220 | 200 |
| Swelling Ratio* | 3.59 | 3.61 |
| % Insolubles* | 94.5 | 93.4 |

*Immersion fluid was toluene

These examples indicate that even at relatively low levels of conjugated olefinic unsaturation (about 0.5 mole % conjugated olefin units), the high reactivity of the residues leads to successful graft curing as indicated by substantial insolubilization and low swelling ratios.

It is to be understood that this invention is not restricted to the foregoing examples which serve only to illustrate the present invention. Numerous variations may be devised without departing from the scope of this invention.

What is claimed is:

1. A method of crosslinking conjugated diene butyl rubber containing randomly distributed sites of conjugated olefinic unsaturation, which comprises reacting said elastomers with a crosslinking agent comprising at least 1 non-gaseous, soluble, free radical polymerizable monomer in the presence of at least 1 free radical initiator.

2. The method of claim 1, wherein the elastomer contains from about 0.15 to about 10 mole % of conjugated olefinic unsaturation.

3. The method of claim 2, wherein the free radical polymerizable monomer is monofunctional.

4. The method of claim 3, wherein the monofunctional monomer is styrene.

5. The method of claim 2, wherein the free radical polymerizable monomer is polyfunctional.

6. The method of claim 2, wherein the elastomer is crosslinked with a mixture of monofunctional and polyfunctional free radical polymerizable monomers.

7. The method of claim 2, wherein the free radical initiator is selected from the group consisting of organic peroxides and organic hydroperoxides.

8. The method of claim 7, wherein the decomposition of the free radical initiator is accelerated with a compound selected from the group consisting of tertiary amines and metal carboxylates of metals selected from the group consisting of cobalt, vanadium, manganese, copper, lead and iron.

9. The method of claim 2, wherein the elastomer is conjugated diene butyl rubber.

10. The method of claim 9, wherein the free radical polymerizable monomer is monofunctional.

11. The method of claim 9, wherein the free radical polymerizable monomer is polyfunctional.

12. The method of claim 9, wherein the conjugated diene butyl rubber is crosslinked with a mixture of monofunctional and polyfunctional free radical polymerizable monomers.

13. The method of claim 9, wherein the free radical initiator is selected from the group consisting of organic peroxides and organic hydroperoxides.

14. The method of claim 13, wherein the decomposition of the free radical initiator is accelerated with a compound selected from the group consisting of tertiary amines and metal carboxylates of metals selected from the group consisting of cobalt, vanadium, manganese, copper, lead and iron.

15. The method of claim 1, wherein the elastomer is an elastomer containing randomly distributed sites of conjugated olefinic unsaturation and active polymerizable groups pendant to the elastomer backbone.

16. The method of claim 1, wherein the elastomer is an elastomer containing randomly distributed sites of conjugated olefinic unsaturation and non-polymerizable groups pendant to the elastomer backbone.

17. The product of claim 2.

18. The product of claim 9.

* * * * *